United States Patent [19]

McCloskey

[11] 3,893,732
[45] July 8, 1975

[54] ANTI-FRICTION BALL BEARING ASSEMBLY

[75] Inventor: Albert R. McCloskey, Fairfield, Conn.

[73] Assignee: Rockwell International Corporation, Pittsburgh, Pa.

[22] Filed: Mar. 18, 1974

[21] Appl. No.: 451,864

[52] U.S. Cl. .................................. 308/6 C; 308/72
[51] Int. Cl.² ........................................ F16C 29/06
[58] Field of Search ............ 308/4 R, 4 C, 6 R, 6 G, 308/72, 29, 184 R, 184 A

[56] References Cited
UNITED STATES PATENTS

| | | | |
|---|---|---|---|
| 3,360,309 | 12/1967 | Voorhies | 308/72 X |
| 3,659,910 | 5/1972 | Foster | 308/72 X |
| 3,702,718 | 11/1972 | Tassell et al. | 308/72 |
| 3,762,781 | 10/1913 | Zeldman | 308/6 G |

Primary Examiner—M. Henson Wood, Jr.
Assistant Examiner—Gene A. Church

[57] ABSTRACT

An anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a spherical seat on its outer surface to accommodate misalignment between said housing and said shaft, resilient "O" rings disposed on each side of the spherical seat to resiliently restrain the movement of the ball bearing assembly on the spherical seat.

7 Claims, 1 Drawing Figure

ANTI-FRICTION BALL BEARING ASSEMBLY

BACKGROUND OF THE INVENTION

An anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a spherical seat on its outer surface to accommodate misalignment between said housing and said shaft, resilient 0 rings disposed on each side of the spherical seat to resiliently restrain the movement of the ball bearing assembly on the spherical seat.

The prior art is replete with recirculating ball bearing assemblies. Typical prior art forms of bearings of this type are subject to high rates of wear between their respective parts.

One of the primary causes of premature wear in linear ball bearing assemblies can be directly related to misalignment of the shaft with respect to the housing in which the linear bearing is placed. A small degree of misalignment will cause binding of the shaft with respect to the various recirculating balls, and this binding will cause scoring of the balls, the shaft and the various raceway surfaces upon which the balls are supported in their loaded state.

The prior art has attempted to accommodate this misalignment by utilizing intricate and expensive designs which are at best only marginally successful.

This invention represents an improvement on my prior invention in this general area as set forth in my prior filed and copending patent entitled ANTI-FRICTION BALL BEARING ASSEMBLY, filed in the U.S. Pat. Office on Sept. 24, 1973 and assigned Ser. No. 399,834.

SUMMARY OF THE INVENTION

Accordingly, it is a primary object of this invention to provide an anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a spherical seat on its outer surface to accommodate misalignment between said housing and said shaft, resilient 0 rings disposed on each side of the spherical seat to resiliently restrain the movement of the ball bearing assembly on the spherical seat.

It is another object of this invention to provide an anti-friction ball bearing assembly which is particularly adapted to resiliently accommodate mechanical misalignment of the shaft with respect to the housing in which the bearing is mounted, the mechanical misalignment being of the type that is primarily caused by mounting and fabrication inaccuracies in the overall bearing system.

It is still another object of the present invention to provide a highly efficient ball bearing assembly which is capable of being inexpensively manufactured and being simplistic in design.

It is still another object of the present invention to provide an anti-friction ball bearing assembly which can be used with "standard catalog housings", therefore obviating the need for extra and external accessories.

It is still another object of the present invention to provide an anti-friction ball bearing assembly which can be manufactured using high volume automated techniques.

It is yet another object of the present invention to provide an anti-friction ball bearing assembly which can accommodate certain dynamic misalignments.

Other objects of the present invention and details of the structure of the anti-friction ball bearing assembly will appear more fully from the folllowing description and accompanying drawings.

DETAIL DESCRIPTION OF THE INVENTION

Figure 1:
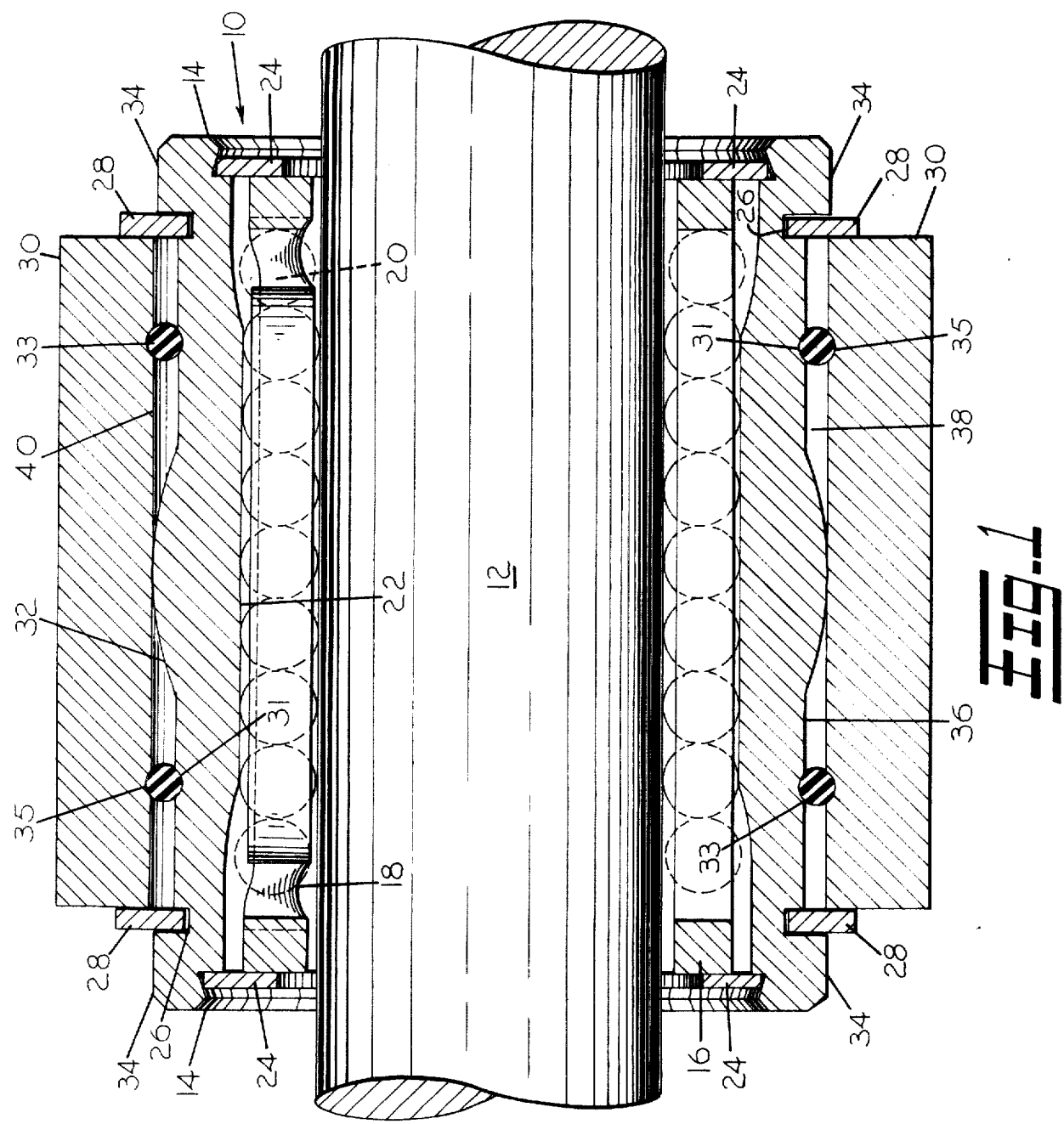
FIG. 1 is a side elevational view partially cut away of an anti-friction ball bearing assembly mounted on a shaft embodying the concept of the present invention.

Referring now to the drawing, that is FIG. 1, there is shown an improved anti-friction ball bearing assembly embodying the concept of the present invention wherein the anti-friction ball bearing assembly is generally designated by the numeral 10. The anti-friction ball bearing assembly 10 is particularly adapted for being mounted, for linear translation thereon, on a shaft 12. The anti-friction ball bearing assembly 10 is provided with an outer sleeve 14 and an inner sleeve 16. The outer surface of the inner sleeve 16 may be polyhedronal in shape and may have a number of axially extending planar surfaces (not shown).

The inner sleeve 16 is further provided with a number of closed loop tracks 18 which define paths with circulation of load carrying balls 20. The inner surface of the outer sleeve 14 may also be polyhedronal in shape. The inner surface of the outer sleeve 14 has a number of axially extending planar surfaces. The shape of the inner surface of the outer sleeve 14 generally conforms to the shape of the outer surface of the inner sleeve 16. The outer surface of the inner sleeve 16 therefore may be placed in registration with the inner surface of the outer sleeve at their respective axially extending planar surfaces.

A plurality of axially extending bearing raceways 22 are provided on the inner surface of the outer sleeve 14.

The retaining means such as snap rings 24 are provided at each end of the anti-friction ball bearing assembly 10 to positionally anchor the inner sleeve 16 in the outer sleeve 14 to thereby maintain the operational integrity of the anti-frictional ball bearing assembly 10. The snap rings 24 therefor maintain the axial position of the inner sleeve 16 with respect to the outer sleeve 14 while the aforementioned registration of the axially extending planar surfaces of the inner sleeve 16 and the outer sleeve 14 maintain the radial position of the inner sleeve 16 with respect to the outer sleeve 14.

The outer surface of the outer sleeve 14 generally embodies and contains the critical departure from the prior art forms of linear bearings. It can be seen from FIG. 1 that the outer surfaces is in reality a number of different surfaces each performing certain complimentary functions.

The outer surface of the outer sleeve 14 is provided with annular grooves 26. These annular grooves 26 are adapted to receive retaining means such as snap rings 28.

The snap rings 28 axially position the anti-friction ball bearing assembly 10 within housing 30.

The outer surface of the outer sleeve 14 is also provided with an annular spherical seat 32 whose form was generated from the material comprising the outer sleeve 14.

That is, the spherical seat 32, is integral with the outer sleeve and is of the same material as the outer sleeve 14. The height of the spherical seat, as defined by its radius of curvature, may be substantially equal to the original outside diameter of the ends 34 of the outer sleeve 14.

The outer sleeve 14 is further provided with two annular areas 36 and 38 having reduced diameters in relation to the diameter of the ends 34 of outer sleeve 14. These recesses 36 and 38 bracket the spherical seat 32 such that the spherical seat 32 may be characterized as a truncated spherical portion.

The outer sleeve 14 is further provided with two annular recesses 31 which are adapted to receive two resilient 0 ring members 33. The inner surface of the housing 30 are also provided with two annular recesses 35 which are in line with the annular recesses 31 and are also adapted to receive the 0 ring member 33. Accordingly the annular recesses 31 and 35 positionally retain the 0 ring members 33.

The inner surface 40 of the housing 30 is typically cylindrical in shape and has a diameter substantially equal to, or slightly larger, than the original outside diameter of the outer surface 34 of the outer sleeve 14. It can be seen, therefor, that the spherical seat 32 is in point contact with the inner surface 40 of the housing 30. It can be further seen that the annular recesses 36 and 38 enable the housing 30 to rotate slightly with respect to the anti-friction ball bearing assembly 10 and the shaft 12 and vice versa. This degree of rotation will be resiliently restrained by the action of the resilient 0 ring members and enables the overall power transmission system to resiliently accommodate misalignment of the shaft 12 with respect to the housing 30 and its associated machine element, etc. It is to be noted that one or more 0 rings could be provided on either side of the spherical seat 32. Furthermore, 0 rings could be placed on just one side of the spherical seat 32. Additionally, the 0 rings could be so sized with respect to the space between the outer surface of the outer sleeve in the annular recess region and the inner surface 40 of the housing 30 to provide a pre-loading force therebetween. The 0 ring could be manufactured from a wide range of materials such as resilient plastic and/or rubber. This will, of course, depend on application and environment.

The misalignment that is typically encountered is static misalignment, that is, misalignment built into the system as for example that misalignment which may be caused by an improperly aligned shaft. The rotation of the housing 30 with respect to the anti-friction bearing assembly 10 and the shaft 12 will also accommodate certain degrees of dynamic misalignment such as may be caused by different loading vectors.

It should be noted that the accommodation of static and dynamic misalignment forces is achieved by the present invention without any special accessories, parts or the like and utilizes off-the-shelf components such as standard housings 30.

FIG. 1 shows the annular spherical seat 32 disposed at a central point on the outer surface of the outer sleeve 14. It should be noted that the annular spherical seat 32 and the 0 ring members 35 could be placed in an off-set position on the outer surface of the outer sleeve 14 to accommodate greater degrees of misalignment that may occur in one direction. Further, such off-set spherical seats 32 and/or the 0 ring members 35 may be used on different anti-friction ball bearings 10 supporting the same shaft 12 in opposed positions, such that each anti-friction ball bearing 10 will compliment the misalignment capabilities of the other anti-friction ball bearing assembly.

The annular spherical seat 32 may be provided with a coating of self-lubrication plastic (not shown), such as polytetrafluoroethylene.

It is therefore, obvious, that the present invention is not to be limited to the specific details as herein described, but is capable of other modifications and changes without departing from the spirit and scope of the appended claims.

I claim:

1. An anti-friction ball bearing assembly, adapted for mounting within a housing comprising an outer sleeve and an inner sleeve concentrically fitting within said outer sleeve, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a spherical seat on its outer surface and integral thereto to accommodate misalignment between said housing and said shaft, a resilient 0 ring disposed at least one side of said spherical seat to resiliently restrain the movement of said ball bearing assembly on said spherical seat.

2. An anti-friction ball bearing in accordance with claim 1 in which there is one resilient 0 ring diposed on each side of said spherical seat.

3. An anti-friction ball bearing in accordance with claim 1 in which there is a plurality of 0 rings disposed on each side of said spherical seat.

4. An anti-friction ball bearing in accordance with claim 1 in which there is one 0 ring disposed on one side of said spherical seat.

5. An anti-friction ball bearing in accordance with claim 1 in which there is a plurality of 0 rings disposed on one side of said spherical seat.

6. An anti-friction ball bearing in accordance with claim 2 in which said 0 rings are equidistantly spaced from said spherical seat.

7. An anti-friction ball bearing in accordance with claim 6 in which said 0 rings are slightly over-sized and effect a preloading force between said housing and said bearing assembly.

* * * * *